「United States Patent」 [11] 3,607,831

[72] Inventors Bruno Sander;
 Wilhelm Schuette, both of Ludwigshafen, Germany
[21] Appl. No. 768,158
[22] Filed Oct. 16, 1968
[45] Patented Sept. 21, 1971
[73] Assignee Badische Anilin- & Soda-Fabrik Aktiengesellschaft
 Ludwigshafen(Rhine), Germany
[32] Priority Oct. 17, 1967, Oct. 17, 1967
[33] Germany
[31] P 16 69 727.1 and P 16 69 728.2

[54] THERMOPLASTIC POLYACETALS STABILIZED WITH AMINOCARBOXYLIC AMIDES
7 Claims, No Drawings

[52] U.S. Cl..................................................... 260/45.9,
 260/45.95

[51] Int. Cl..................................................... C08f 45/60
[50] Field of Search........................................ 260/45.9,
 45.9 PA

[56] References Cited
UNITED STATES PATENTS
3,131,165 4/1964 Hermann et al. ............. 260/45.9
3,274,149 9/1966 Berardinelli.................. 260/45.8
3,376,255 4/1968 Wagner et al................. 260/45.75

Primary Examiner—Donald E. Czaja
Assistant Examiner—Ronald W. Griffin
Attorney—Johnston, Root, O'Keeffe, Keil, Thompson & Shurtleff ABSTRACT: A process for stabilizing polyacetals against thermal degradation by adding special aminocarboxylic amides of the type of β-aminolactamide, with or without polycondensates of isophthalic diamide, N,N'-alkyleneureas and formaldehyde.

3,607,831

THERMOPLASTIC POLYACETALS STABILIZED WITH AMINOCARBOXYLIC AMIDES

This invention relates to a process for stabilizing high molecular weight polyacetals which consist to the extent of 80 percent by weight oxymethylene units against the action of heat by the addition of aminocarboxylic amides.

Known polyacetals of this type are the high molecular weight polymers of formaldehyde and trioxane, for example those whose terminal hydroxyl groups have been stabilized by chemical reaction such as by etherification or esterification and also in particular copolymers of trioxane with copolymerizable compounds which introduce into the polymer chain oxyalkylene units having at least two adjacent carbon atoms, for example with cyclic acetals or ethers which have at least two adjacent carbon atoms in the molecule such as ethylene oxide, 1,3-dioxolane, 1,3-dioxacycloheptane or diglycolformal, or with linear polyacetals such as polydioxolane.

It is known that polyacetals can be stabilized against thermal degradation such as occurs for example in the processing of polyacetals in conventional processing equipment for thermoplasts, by the addition of amides, ureas, thioureas, hydrazines hydrazides, aromatic nitro compounds, polyamides or polycondensates of formaldehyde and diamides.

The effectiveness of heat stabilizers hitherto known is not entirely satisfactory however for this purpose. For example, low molecular weight amides and polyamides tend to discolor the polyacetal compositions at elevated processing temperatures.

It is also known from U.S. Pat. No. 3,131,165 and also from U.S. Pat. No. 3,274,149 that aminoamides exert a stabilizing effect on oxymethylene polymers. Molding materials which contain aminoamides of the said type as thermal stabilizers have a tendency in processing however not only to from troublesome coatings on molds but also to discolor.

We have now found that thermoplastic polyacetals consisting to the extent of at least 80 percent by weight of oxymethylene units can be stabilized against the action of heat by the addition of stabilizing amounts of aminocarboxylic amides with or without conventional antioxidants without the said disadvantages by using, as the aminocarboxylic amide a derivative of β-aminolactamide having the general formula:

$$R^1-N-CH_2-CH-C-NH_2$$
$$\phantom{R^1-N-}|\phantom{CH_2-}|\phantom{CH-C-}\|$$
$$\phantom{R^1-N-}R^2\phantom{CH_2-}OH\phantom{CH-C}O$$

in which:
— $R^1$ denotes one of the groupings:

$-H, -OH, -NR^2R^2, -CH_2-CH(OH)-CONH_2$ or

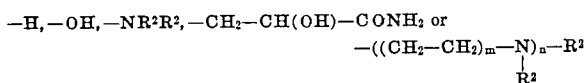

in which $m$ denotes 1 to 3 and $n$ denotes 1 or 2 or $m$ denotes 1 and $n$ denotes 1 to 3 or

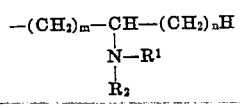

in which $m+n$ denote from 1 to 5 and $m$ denotes from 1 to 5; and $-R^2$ denotes either -H or -CH$_2$-CH(OH)-CONH$_2$.

We have further found that derivatives of β-aminolactamide which contain more than one lactamide radical in the molecule are particularly suitable as thermal stabilizers for oxymethylene polymers.

It is preferred to use nitrilotrilactamide and/or ethylenediaminetetralactamide as derivatives of β-aminolactamide.

Particularly favorable results are obtained in the said process when (additionally to the said class of compound) a polycondensate is added which has been obtained from isophthalic diamide, a cyclic N,N'-alkyleneurea having for example two to five, particularly 2 to 3, carbon atoms and for- maldehyde or a substance which yields formaldehyde. Examples of suitable cyclic alkyleneureas are N,N'-ethyleneurea, N,N'-propyleneurea, 4-methoxy-5,5-dimethyl-N,N'-propyleneurea, 4-hydroxy-5,5-dimethyl-6-isopropyl-N,N'-propyleneurea and mixtures of the same. Unsubstituted cyclic alkyleneureas such as N,N'-ethyleneurea and N,N'-propyleneurea are however also particularly suitable.

It is surprising that unlike molding materials stabilized with the aminoamides hitherto used the molding materials stabilized according to this invention do not form any coatings on molds and practically do not discolor at conventional processing temperatures. It is also of advantage that these special aminoamides have a better stabilizing effect than prior art stabilizer of the said type and consequently smaller amounts of additive are required for the stabilization of the polyacetals. It is also surprising that in the stabilization of polyacetals with derivatives of β-aminolactamide it is necessary as a rule to use smaller amounts of oxidation stabilizers than when using prior art thermal stabilizers. The thermal stabilizers according to the invention thus act in a synergistic manner with conventional antioxidants such as 2,2'-methylene-bis-(4-methyl-6-tert-butylphenol) or 2,2'-butylidene-bis-(4-methyl-6-tert-butylphenol).

Another advantage of the new thermal stabilizers is that owing to the ease with which they can be crystallized they can be prepared in a very pure state and can easily be incorporated into the polyacetals.

The thermal stabilizers according to the invention are added by conventional methods to the macromolecular polyacetals in amounts of from 0.05 to 5 percent, preferably from 0.1 to 1 percent, by weight with reference to the weight of polyacetal. Owing to the good stabilizing effect, an addition of from 0.1 to 0.3 percent by weight is generally adequate.

If a polycondensate of the above-mentioned type is also used for the stabilization, it is advantageous to use it in amounts of from 0.05 to 2.0 percent, preferably from 0.1 to 1.0 percent, by weight and the derivative of β-aminolactamide in amounts of from 0.01 to 1.5 percent, preferably 0.05 to 1.0 percent, by weight with reference to the polymer. The total amount of stabilizer mixture may be up to 3 percent by weight. It is preferable however to use an amount of from 0.15 to 1.5 percent by weight.

The derivatives of β-aminolactamide used in accordance with this invention may be easily prepared for example by the addition of glycidamide:

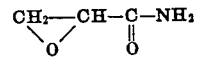

to an amine by known methods. The lactamide radical may be introduced once or more than once. Glycidamide may be obtained for example by reaction of acrylonitrile with hydrogen peroxide in aqueous solution according to U.S. Pat. No. 3,217,016.

The following are examples of amine components suitable for the reaction: ammonia, hydrazine, hydroxylamine, the $C_2$ to $C_6$ alkylene diamines such as ethylene diamine, propylene diamine-1,2, propylene diamine-1,3, hexamethylene diamine-1,6, and also diethylene triamine, triethylene and tetramine and tetraethylene pentamine.

The reaction products of glycidamide with ammonia and $C_2$ and $C_6$ alkylene diamines are particularly suitable thermal stabilizers from the stabilizers used according to this invention. The following are examples: nitrilotrilactamide, iminodilactamide, ethylenediaminetetralactamide, hexamethylenediamine-1,6-tetralactamide and mixtures of these, particularly mixtures such as may be formed in the production of the said substances.

It is generally advantageous also to add to the polyacetals stabilized against degradation by heat, from 0.01 to 3 percent, preferably from 0.1 to 0.5 percent, by weight of conventional antioxidants for oxymethylene polymers. Phenolic antioxidants are preferred, particularly alkylenebisphenols, as for example 2,2'-methylene-bis-(4-ethyl-6-tert-butylphenol), 2,6-ditert-butyl2p-cresol, 2,2'-methylene-bis-(4-methyl-6-tert-butylphenol) and 2,2'-butylidene-bis-(4-methyl-6-tert-butylphenol. Hydrazones such as benzaldehyde-(N-methyl)-phenylhydrazone, piperonal-(N-methyl)-phenylhydrazone, 3,5-ditert-butyl-4-hydroxybenzaldehyde-(N-methyl)-phenylhydrazone and mixtures of the said compounds are also very suitable. In some cases it may prove useful to add to the polyacetals stabilized according to this invention, not only antioxidants but also other prior art thermal stabilizers.

The stabilizers to be used according to this invention are in this stability test.

The occurrence of coatings on molds is determined in comparative injection molding tests in dependence on the temperature of the melt.

The results of the tests are given in the table in which the following abbreviations are used:- M =molding material sample; AA =amount of antioxidant in percent; Loss =loss in weight of the sample after 2 hours at 222° C. under air in percent; Color =color after 2 hours at 222° C. under air; MCF =temperature at which mold coatings form in °C.; c =colorless; b =brown; b =yellow brown;

TABLE

| M | Thermal stabilizer | | AA | Loss | Color | MCF |
|---|---|---|---|---|---|---|
| | Type | Amount | | | | |
| 1 | Nitrilotrilactamide | 0.2 | 0.4 | 0.54 | c | |
| 2 | do | 0.2 | 0.3 | 0.60 | c | |
| 3 | do | 0.2 | 0.2 | 0.79 | c | |
| 4 | do | 0.1 | 0.2 | 0.90 | c | |
| 5 | Ethylenediaminetetralactamide | 0.2 | 0.3 | 0.71 | c | |
| 6 | Nitrilotripropionamide | 0.1 | 0.2 | 1.93 | b | 220 |
| 7 | do | 0.2 | 0.4 | 0.97 | b | 230 |
| 8 | Dicyanodiamide | 0.2 | 0.4 | 0.95 | yb | | readily miscible with the polyacetals. They may be incorporated into powdered polyacetals, if desired together with pigments, fillers and the like, in conventional dry mixers and also easily introduced in solid or dissolved form into molten polyacetals. In the case of trioxane copolymers, the stabilizers may advantageously be added after removal of unstable constituents (effected for example by hydrolytic or thermal degradation of unstable chain segments) to the powdered or granulated copolymer and incorporated by fusion and homogenization. The addition of stabilizers prior to processing and degassing of the copolymers has also proved to be suitable in the case of trioxane copolymers.

Polyacetals which have been stabilized according to this invention may be processed repeatedly from a melt without discoloring and may be used for the conventional uses of oxymethylene polymers, such as the production of moldings, film and sheeting.

The following examples illustrate the invention. The parts and percentages given in the examples and comparative experiments are by weight.

EXAMPLES AND COMPARATIVE EXPERIMENTS (cf Table)

A sample of a copolymer from 97 percent of trioxane and 3 percent of 1,3-dioxolane (which has been fused and degassed in a degassing screw with an addition of 0.02 percent of sodium fluoride and the various amounts of 2,2'-methylene-bis-(4-methyl-6-tert-butylphenol) indicated in the table as antioxidant) is processed on an extruder with various amounts of thermal stabilizers set out in the table to form a granulate.

The stability of the various stabilized molding material is determined by measuring the loss in weight of samples after they have been heated for 2 hours at 222° C. while passing air over them. The degree of discoloration may also be detected

We claim:
1. A polymer composition comprising thermoplastic polyacetals consisting to the extent of at least 80 percent by weight of oxymethylene units and a stabilizing amount of a compound obtained by replacing at least one N-bound hydrogen of ammonia, hydrazine, hydroxylamine, a $C_2$ to $C_6$ alkylene diamine or a polymeric ethylene diamine of formula $H_2N_nH$, wherein n is an integer from 2 to 4 with a lactamide radical of formula

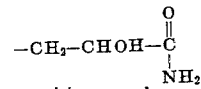

2. A polymer composition as claimed in claim 1, wherein said stabilizing compound is obtained by reacting glycidamide with a compound selected from the group consisting of ammonia, hydrazine, hydroxylamine, a $C_2$ to $C_6$ alkylene diamine and a polymeric ethylene diamine of formula

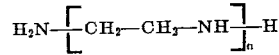

wherein n is an integer from 2 to 4.

3. A polymer composition as claimed in claim 2, wherein said stabilizing compound is obtained by addition of glycidamide to ammonia.

4. A polymer composition as claimed in claim 2, wherein said stabilizing compound is obtained by addition of glycidamide to ethylenediamine.

5. A polymer composition comprising thermoplastic polyacetals consisting to the extent of at least 80 percent by weight of oxymethylene units and a stabilizing amount of nitrilotrilactamide or ethylenediaminetetralactamide.

6. A polymer composition as claimed in claim 5, wherein said stabilizing compound is nitrilotrilactamide.

7. A polymer composition as claimed in claim 5, wherein said stabilizing compound is ethylenediaminetetralactamide.

PO-1050
(5/69)

UNITED STATES PATENT OFFICE
CERTIFICATE OF CORRECTION

Patent No. 3,607,831          Dated September 21, 1971

Inventor(s) Bruno Sander and Wilhelm Schuette

It is certified that error appears in the above-identified patent and that said Letters Patent are hereby corrected as shown below:

Column 1, line 23, "hydrazines hydrazides" should read -- hydrazines, hydrazides --.

Column 2, line 61, "triethylene and tetramine" should read -- triethylene tetramine --.

Column 3, line 2, "ditert-butyl2p-cresol" should read -- ditert-butyl-p-cresol --; line 4, "tylphenol" should read -- tylphenol) --.

Column 4, line 11, "b=yellow" should read -- yb=yellow --; line 30, claim 1, "$H_2N_nH$" should read -- $H_2N + CH_2-CH_2-NH]_n-H$ --.

Signed and sealed this 18th day of April 1972.

(SEAL)
Attest:

EDWARD M. FLETCHER, JR.          ROBERT GOTTSCHALK
Attesting Officer          Commissioner of Patents